United States Patent

Inglin

[11] Patent Number: 5,929,387
[45] Date of Patent: Jul. 27, 1999

[54] INDEXED WORM CONVEYOR

[75] Inventor: Eric A. Inglin, Ithaca, N.Y.

[73] Assignee: Hi-Speed Checkweigher Co., Inc., Ithaca, N.Y.

[21] Appl. No.: 08/876,567

[22] Filed: Jun. 16, 1997

[51] Int. Cl.[6] .......................... G01G 13/02; G01G 13/04; G01G 19/00; B65B 1/30
[52] U.S. Cl. .......................... 177/119; 177/121; 177/145; 141/83
[58] Field of Search .................................. 177/119, 121, 177/145; 141/83

[56] References Cited

U.S. PATENT DOCUMENTS

| 3,955,637 | 5/1976 | Del Rosso | 177/145 |
| 3,955,665 | 5/1976 | Pettis, Jr. et al. | 198/39 |
| 4,238,027 | 12/1980 | Oelte | 198/504 |
| 4,334,493 | 6/1982 | Salmonsen et al. | 177/145 |
| 4,538,694 | 9/1985 | Hudson | 177/145 |
| 4,708,237 | 11/1987 | Buisson et al. | 198/726 |
| 5,236,337 | 8/1993 | Kikuchi et al. | 177/52 |
| 5,434,366 | 7/1995 | Troisi | 177/52 |
| 5,740,843 | 4/1998 | Burkart | 141/83 |

Primary Examiner—Randy W. Gibson
Attorney, Agent, or Firm—Simpson, Simpson & Snyder

[57] ABSTRACT

A mechanism for weighing articles including a continuous thread screw conveyor for moving articles to be weighed across a weigh pan in combination with a motor for first driving the conveyor in an article transport direction through an angle of $360°+\alpha°$ and then driving the conveyor in a reverse direction through an angle of $\alpha°$ to remove the conveyor from frictional engagement with the article, during each article weighing operation.

2 Claims, 2 Drawing Sheets

INDEXED WORM CONVEYOR

BACKGROUND OF THE INVENTION

It is known to employ a continuously rotating, interrupted worm or screw conveyor to transport articles to be weighed one at a time across a weigh pan or scale device. The interruption of the thread of the worm is required in order to disengage the worm from an article during the weighing operation, which occurs during approximately one-half of a rotational cycle of the worm.

In that the worm continues to rotate during a weighing operation as the article comes to rest on a weigh pan, the thread of the worm is required to have a relatively large pitch in order to provide a substantial distance between the article on the weigh pan and an adjacent trailing article, so as to prevent the trailing article from moving on to the weigh pan while occupied by the article being weighed.

SUMMARY OF THE INVENTION

The invention relates to the weighing of articles transported by a worm or screw conveyor one at a time across a weigh pan, and more particularly to the use of uninterrupted worm or screw in combination with a servo motor or other suitable reversible drive device by which the worm is first driven in an article transport direction through an angle of 360° plus $\alpha°$, stopped, then driven in a reverse direction through a small angle of $\alpha°$, during each article weighing cycle, whereby to accurately place a single article on the weigh pan free of frictional engagement with the thread of the worm.

The worm employed in connection with the present invention may have a relatively small thread pitch adjacent the weigh pan, as compared to prior worm conveyors, whereby to allow articles to be transported at a slower linear speed across a weigh pan for any given worm RPM, or for a given linear speed to effect weighing of a larger number of articles per unit time. Moreover, the substantial decrease in pitch achieved by use of the present invention allows the overall axial length of the worm to be substantially shortened compared to prior worm conveyors of the type described.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
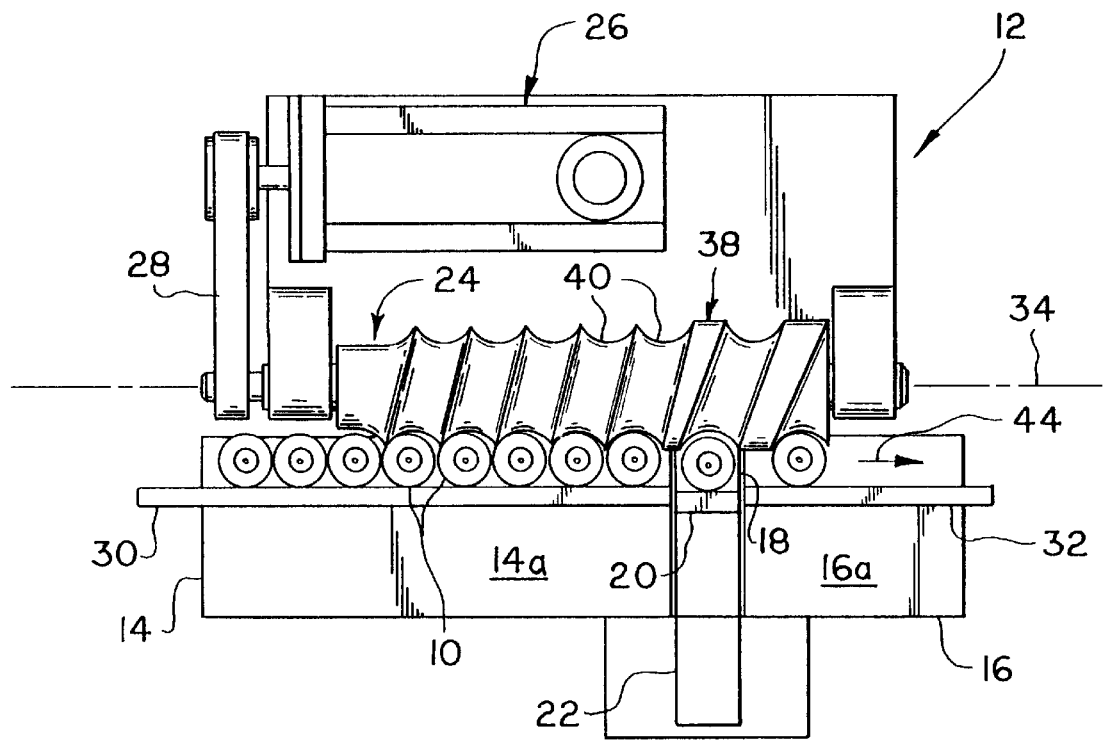
FIG. 1 is a top plan view of a mechanism for weighing articles which incorporates the present invention.
Figure 2:
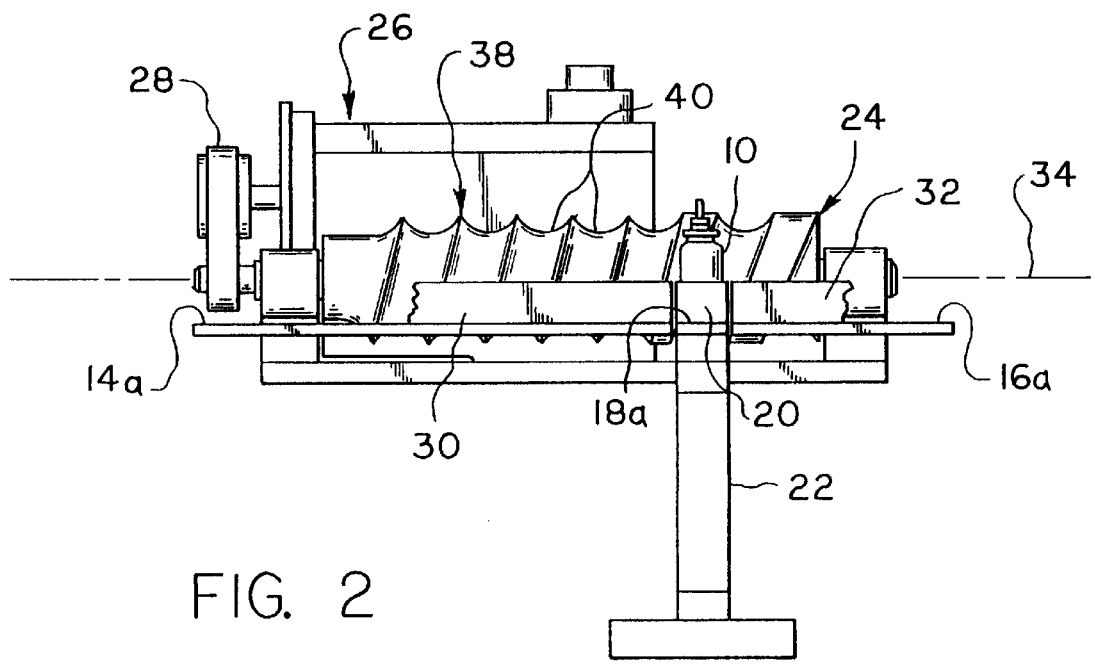
FIG. 2 is a front elevational view thereof.

Reference is first made to FIGS. 1 and 2, wherein a mechanism formed in accordance with a preferred form of the present invention and adapted for use in the weighing of articles 10 one at a time is generally designated as 12 and shown as including stationary article infeed and discharge supports 14 and 16, respectively, arranged in alignment with a weigh pan 18 having an upstanding guide plate 20 and being supported for article weight induced vertical movements by a load cell 22; a worm or screw conveyor 24 driven by a servo motor 26 via a drive belt 28; and aligned article guides 30 and 32, which extend coextensively with supports 14 and 16, respectively, and are arranged essentially parallel with the rotational axis 34 of worm 24. The upper, article engaging or support surfaces 14a and 16a of supports 14 and 16 are essentially coplanar with the upper, article engaging or support surface 18a of weigh pan 18, when the latter is in an unloaded condition.

Figure 4:
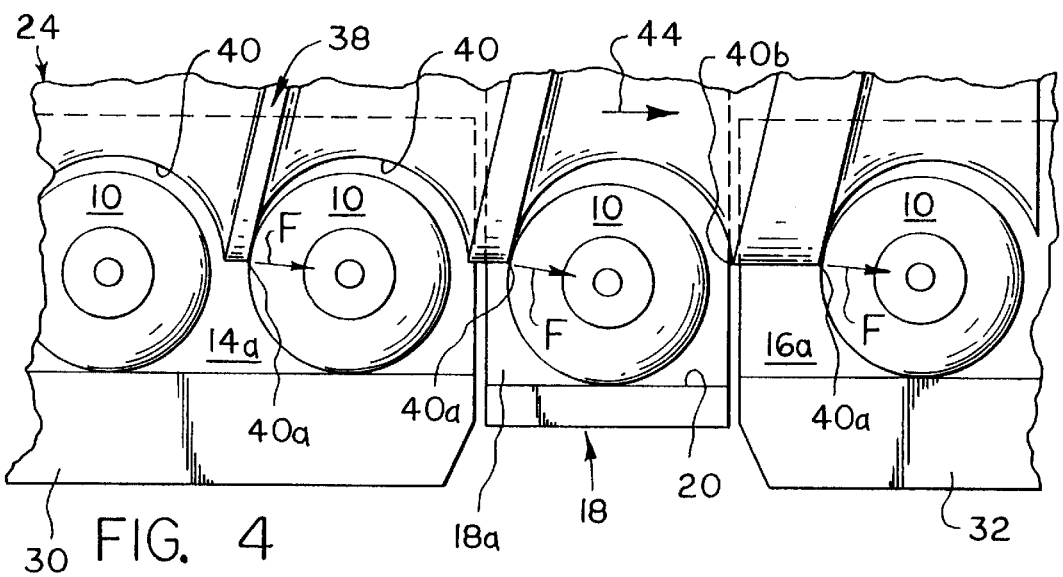
FIG. 4 is an enlarged view showing a worm at the completion of rotation through an angle of 360°+$\alpha°$ to place an article to be weighed on a weigh pan.
Figure 5:
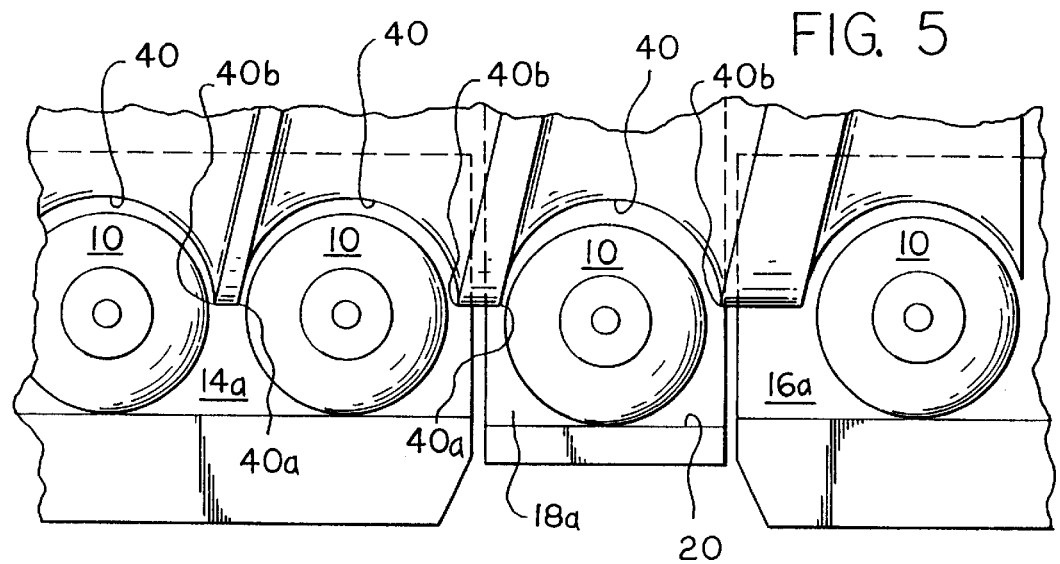
FIG. 5 is a view similar to FIG. 4, but showing the worm at the completion of counter rotation of angle $\alpha°$ to remove the worm from engagement with the article on the weigh pan.

Weigh pan 18 is sized slightly wider than articles 10 to be weighed, so as to allow only one article at a time to be supported by the weigh pan, as best shown in FIGS. 4 and 5. Also, in the preferred form of the present invention, weigh pan guide plate 20 is slightly horizontally offset relative to stationary guides 30 and 32 such that it is spaced a slightly greater distance from rotational axis 34 than such guides.

Now referring to FIG. 4, it will be noted that the thread 38 of worm 24 cooperates with guides 30, 20 and 32 to define pockets 40, which are individually sized to receive one of articles 10 and move lengthwise of the worm, as it rotates in order to transport the articles in a direction of travel indicated by arrow 44 shown in FIG. 1. Preferably, the radius of curvature of worm 24 bounding each pocket 40 is slightly greater than that of articles 10, as indicated in the drawings, and guides 20, 30 and 32 are spaced from axis 34, such that the articles are forced to move partially away from the worm into sliding engagement with such guides incident to rotation of the worm. In this respect, it will be noted that a trailing edge 40a of each pocket 40 exerts a pushing force F on its associated article, which forms a slight angle relative to worm axis 34 whose value varies with article size or diameter and the diameter of worm 24.

Articles 10 are passed through conveyor mechanism 12 in a stepwise manner such that the articles are successively positioned one at a time on weigh pan 18. Specifically, during each article weighing operation, worm 24 is first driven by motor 26 for rotation through an angle of 360°+$\alpha°$, whereby to move one article off of infeed support 14 onto weigh pan 18 and a previously weighed article off of the weigh pan onto discharge surface 16 in a direction indicated by arrow 44 shown in FIG. 4. Immediately thereafter, motor 26 is operated to drive worm 24 in an opposite direction through the angle of $\alpha°$, which is sufficient to insure that trailing edge 40a is removed from engagement with the article supported by the weigh pan, as shown in FIG. 5, but which will not at the same time move leading edge 40b of pocket 40 rearwardly into engagement with such article. Weighing of the article on weigh pan 18 is then initiated, and upon completion of the weighing operation, worm 24 is again rotated through an angle of 360°+$\alpha°$ for purposes of moving a previously weighed article off of weigh pan and onto support surface 16 and moving an immediately trailing article off of support surface 14 and onto the weigh pan. It will be noted that the placement of weigh pan guide plate 20 further from worm axis 34 than stationary guides 30 and 32, allows an article to be weighed to move away from such axis and reduce the value of $\alpha°$ required to insure that such article is removed from frictional engagement with worm 24. Depending on operating condition, the article placed on weigh pan 18 may slide a short distance after rotation of worm 24 is arrested, but engagement of trailing edge 40a may not be consistently avoided or insured without reverse rotation of the worm through angle α°, whose value varies with article size. As by way of example, an angle α° producing a linear displacement of trailing edge 40a of on the order of no more than about ¹⁄₁₆ inch would be satisfactory.

Figure 3:
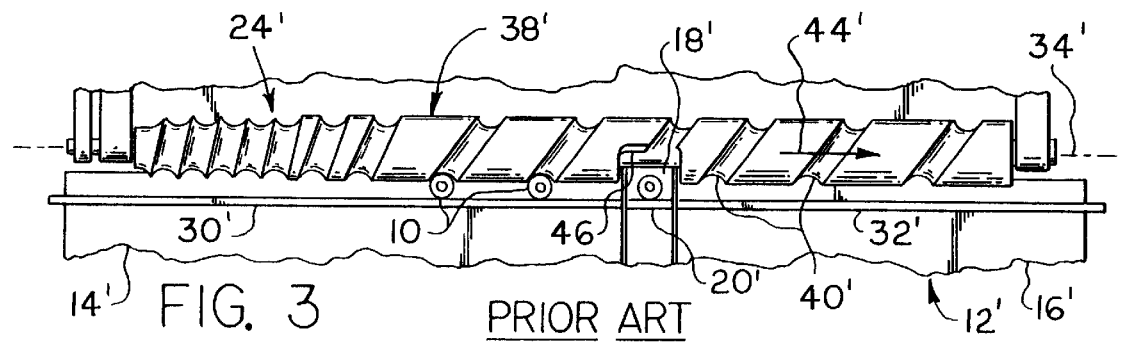
FIG. 3 is a fragmentary view similar to FIG. 1, but showing a mechanism of the prior art employing a continuously driven, interrupted worm conveyor.

Reference is now made to FIG. 3 wherein a typical prior worm conveyor feed, weighing mechanism is generally designated as 12' and shown as including stationary article infeed and discharge supports 14' and 16', respectively, arranged in alignment with a weigh pan 18' having an upstanding guide plate 20' and being supported for article weight induced vertical movements by a load cell 22'; a worm or screw conveyor 24'; and article guides 30' and 32' which extend coextensively with supports 14' and 16', and are arranged in alignment with guide plate 20' and parallel to a rotational axis 34' of worm 24'.

Worm 24' employed in known prior mechanism of the type described are intended to be continuously driven by a suitable motor, not shown, at some given speed so as to transport articles 10 in a direction of travel indicated by arrow 44'. With a view towards temporarily interrupting driven forward movement of an article positioned on weigh pan 18' during a weighing operation, it is necessary to cut away an annular portion of conveyor thread 38', as at 46, through an angle of about 180°. Thus, the article to be weighed is permitted to slide to a stop on weigh pan 18, as both trailing and preceding articles continue to be transported along supports 14' and 16'. With this arrangement, a weighing operation must be completed before thread 38' is again brought into engagement with the article positioned on the weigh pan 18' and thread 38' is required to have a relatively large pitch at least adjacent the discharge end of infeed support 14', so as to prevent a trailing article from moving onto the weigh pan while occupied by the article being weighed.

By comparing FIGS. 1 and 3, it will be understood that the pitch of thread 38 of worm 24 of the present invention may be relatively small adjacent weigh pan 18 compared to the pitch of thread 38', whereby to allow articles 10 to be transported through mechanism 12 at a lower linear speed for any given worm RPM, or for a given linear speed to effect weighing of a larger number of articles. The decrease in pitch of uninterrupted worm 24 compared to prior interrupted worm conveyors also allows the length of worm, and thus the overall length of mechanism 12, to be substantially reduced providing savings in space for installations, such as clean rooms, where space is at a premium. The permitted reduction in the speed of travel of the articles serves to increase weighing accuracy and to reduce slushing of liquid product within articles 10.

It is contemplated that various changes may be made in the construction of above described mechanism 12. As by way of example, discharge support 16 and guide 32 may be dispensed with, where for instance, it is desired to discharge weighed articles directly into an article receiver or container. Alternatively, the discharge support may be replaced by a belt or other takeoff conveyor with guide 32 being arranged as required to guide discharged articles being transported by such conveyor. Further, it is contemplated that the number of pockets 40 shown in the drawings may be substantially reduced, so as to provide one pocket to effect transfer of articles from inlet support 14 onto weigh pan 18 and a second pocket to effect transfer of articles from the weigh pan to discharge support 16 or other desired article receiver.

What is claimed is:

1. A mechanism for weighing articles one at a time comprising in combination:

a weighing means including weigh pan supported for article weight induced vertical movements by a load cell and having an article guide movable therewith;

article infeed support means for supporting articles moving towards said weigh pan and having an article guide;

a screw conveyor having a thread cooperating with said guides to define pockets each sized to receive one of said articles for forcing said articles upon rotation of said screw conveyor to slide in succession from said infeed support means onto said weigh pan and then off of said weigh pan, said thread bounding each pocket having a trailing edge and a leading edge, said guide of said infeed support means and said guide of said weigh pan are disposed parallel to an axis of rotation of said screw conveyor, and said guide of said weigh pan is arranged at a distance from said axis greater than that of said guide of said support means; and drive means for rotating said screw conveyor in a first direction through an angle of 360°+α° for causing said trailing edges of said pockets to simultaneously move said articles to be weighed one at a time from said infeed support means onto said weigh pan and move a previously weighed article present on said weigh pan off of said weigh pan and then rotating said screw conveyor in an opposite direction through an angle of α° to remove said trailing edge from engagement with said article on said weigh pan, wherein rotation of said screw conveyor through said angle α° is insufficient to effect return movement of said leading edge into engagement with said article on said weigh pan and said weighing means affects weighing of an article moved on to said weigh pan by said conveyor after movement of said conveyor in said opposite direction through said angle of α° and before a subsequent movement of said conveyor in said first direction through said angle of 360°+α°.

2. A mechanism for weighing articles one at a time comprising in combination:

a weighing means including weigh pan supported for article weight induced vertical movements by a load cell and having an article guide movable therewith;

article infeed support means for supporting articles moving towards said weigh pan and having an article guide;

a discharge support means disposed to receive articles discharged from said weigh pan and having a guide arranged in alignment with said guide of said infeed support means;

a continuous thread screw conveyor having an axis of rotation and a thread cooperating with said guides to define pockets each sized to receive one of said articles for forcing said articles upon rotation of said screw conveyor to slide in succession from said infeed support means onto said weigh pan and then off of said weigh pan onto said discharge support means, said thread bounding each pocket having a trailing edge and a leading edge, said guides being parallel to said axis of rotation of said screw conveyor, and said guide of said weigh pan is arranged at a distance from said axis greater than that of said guides of said infeed and discharge support means; and drive means for rotating said screw conveyor in a first direction through an angle of 360°+α° for causing said trailing edges of said pockets to simultaneously move said articles to be weighed one at a time from said infeed support means onto said weigh pan and move a previously weighed article present on said weigh pan off of said weigh pan and then rotating said screw conveyor in an opposite direction through an angle of α° to remove said trailing edge from engagement with said article on said weigh pan, wherein rotation of said screw conveyor through said angle α° is insufficient to effect return movement of said leading edge into engagement with said article on said weigh pan, and said weighing means affects weighing of an article moved onto said weigh pan by said conveyor after movement of said conveyor in said opposite direction through said angle of α° and before a subsequent movement of said conveyor in said first direction through said angle of 360°+α°.

* * * * *